US008186838B2

(12) United States Patent
Chen

(10) Patent No.: US 8,186,838 B2
(45) Date of Patent: May 29, 2012

(54) OPTICAL LENS

(75) Inventor: Pin-Chun Chen, Taipei (TW)

(73) Assignee: Edison Opto Corporation, Taipei (TW)

( * ) Notice: Subject to any disclaimer, the term of this patent is extended or adjusted under 35 U.S.C. 154(b) by 204 days.

(21) Appl. No.: 12/573,585

(22) Filed: Oct. 5, 2009

(65) Prior Publication Data

US 2011/0080745 A1 Apr. 7, 2011

(51) Int. Cl.
*G02B 7/02* (2006.01)

(52) U.S. Cl. ......................... 359/611; 359/743; 362/337

(58) Field of Classification Search .................. 359/648, 359/668–671, 707–712, 720, 798, 743, 811; 362/335–337

See application file for complete search history.

(56) References Cited

U.S. PATENT DOCUMENTS

| | | | | |
|---|---|---|---|---|
| 7,625,102 | B2 * | 12/2009 | Koike et al. | 362/277 |
| 7,837,360 | B2 * | 11/2010 | Lee | 362/335 |
| 7,920,337 | B2 * | 4/2011 | Perchak | 359/709 |
| 2008/0231772 | A1 * | 9/2008 | Hung | 349/65 |

* cited by examiner

*Primary Examiner* — Scott J Sugarman
*Assistant Examiner* — Vipin Patel
(74) *Attorney, Agent, or Firm* — Birch, Stewart, Kolasch & Birch, LLP

(57) ABSTRACT

The invention discloses an optical lens for a light-emitting device. The optical lens includes a translucent body which has a concave inner surface to which light is incident. The inner surface includes a first region and a second region opposite to the first region. The first region and the second region are both substantially straight planes and extend inclinedly from the edge of the inner surface to the center of the inner surface respectively, so as to connect with each other. Thereby, the optical lens of the invention is capable of contributing to an elliptic light field.

6 Claims, 8 Drawing Sheets

OPTICAL LENS

BACKGROUND OF THE INVENTION

1. Field of the Invention

The present invention relates to an optical lens, and more particularly, the present invention relates to an optical lens for a light-emitting device.

2. Description of the Prior Art

The lighting characteristic of the street lamp will influence the sight of the person who takes way during the night, so the governments of various countries all have relevant regulations to the illumination intensity and structure of the street lamp, so as to protect the person who takes way. Currently, light-emitting diodes (LEDs) have been applied to provide the light source of the street lamp. Generally speaking, the package structure of an LED is disposed inside the lampshade of the street lamp, and the LED is covered by an optical lens for refracting light emitting from the LED to form the light field 12 as shown in FIG. 1. In the prior art, the light field 12 formed through the optical lens locates along the direction of the central optical axis of the lens, and the light field is about symmetrical.

Because the light field formed through the optical lens in the prior art merely locates along the direction of the central optical axis of the lens, in order to make the light field projected on the road surface to provide illumination for the person who takes way, the lampshade 10 of the street lamp 1 is usually lifted up to make the central optical axis of the lens towards the road surface such that the light field can be projected on the road surface. Please refer to FIG. 1 which illustrates the schematic diagram of the street lamp 1 in the prior art.

However, the lifted up lampshade 10 often introduces glare phenomenon to the person who takes way affecting road safety. Hence, the street lamp in the prior art still needs improvements regarding the road safety for the person who takes way

SUMMARY OF THE INVENTION

An aspect of the invention is to provide an optical lens for a light-emitting device. In practical applications, the optical lens of the invention can be adapted to a light-emitting diode device.

According to an embodiment of the invention, the optical lens includes a translucent body which has a concave inner surface to which light is incident. For example, the concave inner surface can receive the light emitting from a light-emitting diode device. In addition to the inner surface, the translucent body further has an outer surface surrounding the inner surface, and the outer surface can be a curved surface.

Referring to the surface morphology, the inner surface includes a first region and a second region opposite the first region. It should be noted that both the first region and the second region are substantially straight planes. Furthermore, the first region extends inclinedly from the edge of the inner surface to the center of the inner surface, and the second region also extends inclinedly from the edge of the inner surface to the center of the inner surface to connect with the first region.

In an embodiment, the center of the inner surface is a flat region having two side edges opposite to each other. The first region and the second region extend inclinedly from the edge of the inner surface to the flat region and connect with the two side edges respectively.

In another embodiment, the center of the inner surface is a crest line. The first region and the second region extend inclinedly from the edge of the inner surface to the crest line, so as to connect with each other. Besides, from a first cross-section view of the translucent body toward a first direction, the inner surface substantially has a triangular outline, and the first direction is along an extension direction of the crest line. Moreover, in this embodiment, the space enclosed by the concave inner surface substantially has a triangular column.

It should be noted that the inner surface defines a first edge portion, a second edge portion and a central portion, wherein the first edge portion and the second edge portion are separated by the central portion and opposite to each other.

From the first cross-section view within the first edge portion, the triangular outline becomes bigger gradually as the first cross-section view approaches the central portion. From the first cross-section view within the second edge portion, the triangular outline becomes bigger gradually as the first cross-section view approaches the central portion. From the first cross-section view within the central portion, the triangular outline remains unchanged.

It should be particularly explained that after the light emitting from a light-emitting diode device is incident to the first region and the second region of the concave inner surface, the first region and the second region can refract the incident light and make the refracted light diverge from the central optical axis of the lens further.

In addition to the first region and the second region, the inner surface further includes a third region and a fourth region opposite the third region. Both the third region and the fourth region connect with the first region and the second region. In an embodiment, both the third region and the fourth region are curved surfaces and extend from the edge of the inner surface to the center of the inner surface.

In addition, from a second cross-section view of the translucent body toward a second direction, the inner surface substantially has a trapezoid outline. It should be noted that the second direction is perpendicular to the first direction and the second cross-section view is toward the second direction from the center of the inner surface.

It should be particularly explained that after the light emitting from a light-emitting diode device is incident to the third region and the fourth region of the concave inner surface, the traveling path of the light can remain unchanged basically. Since the first region and the second region can make the refracted light diverge from the central optical axis of the lens further, while the third region and the fourth region can make the traveling path of the light remain unchanged, the light emitting from the light-emitting diode device can form an elliptic light field after entering through the optical lens of the invention.

It should be noted that in another embodiment, the third region is substantially a straight plane and extends inclinedly from the edge of the inner surface to the center of the inner surface, while the fourth region is a curved surface and extends inclinedly from the edge of the inner surface to the center of the inner surface.

In another embodiment, the optical lens of the invention further includes a holding seat for mounting the optical lens on the package structure of the light-emitting diode device. The holding seat connects with the periphery of the translucent body, and the holding seat has a formed-through fixing hole for a fixing element to go through. Practically, the fixing hole can be a screw hole. In regards to composition materials, the holding seat can be made of a translucent material as the translucent body. In structure, the holding seat and the translucent body are formed in one piece.

The advantage and spirit of the invention may be understood by the following recitations together with the appended drawings.

BRIEF DESCRIPTION OF THE APPENDED DRAWINGS

DETAILED DESCRIPTION OF THE INVENTION

An aspect of the invention is to provide an optical lens for a light-emitting device. In practical applications, the optical lens of the invention can be adapted to a light-emitting diode device so as to form specific light fields.

Figure 1:
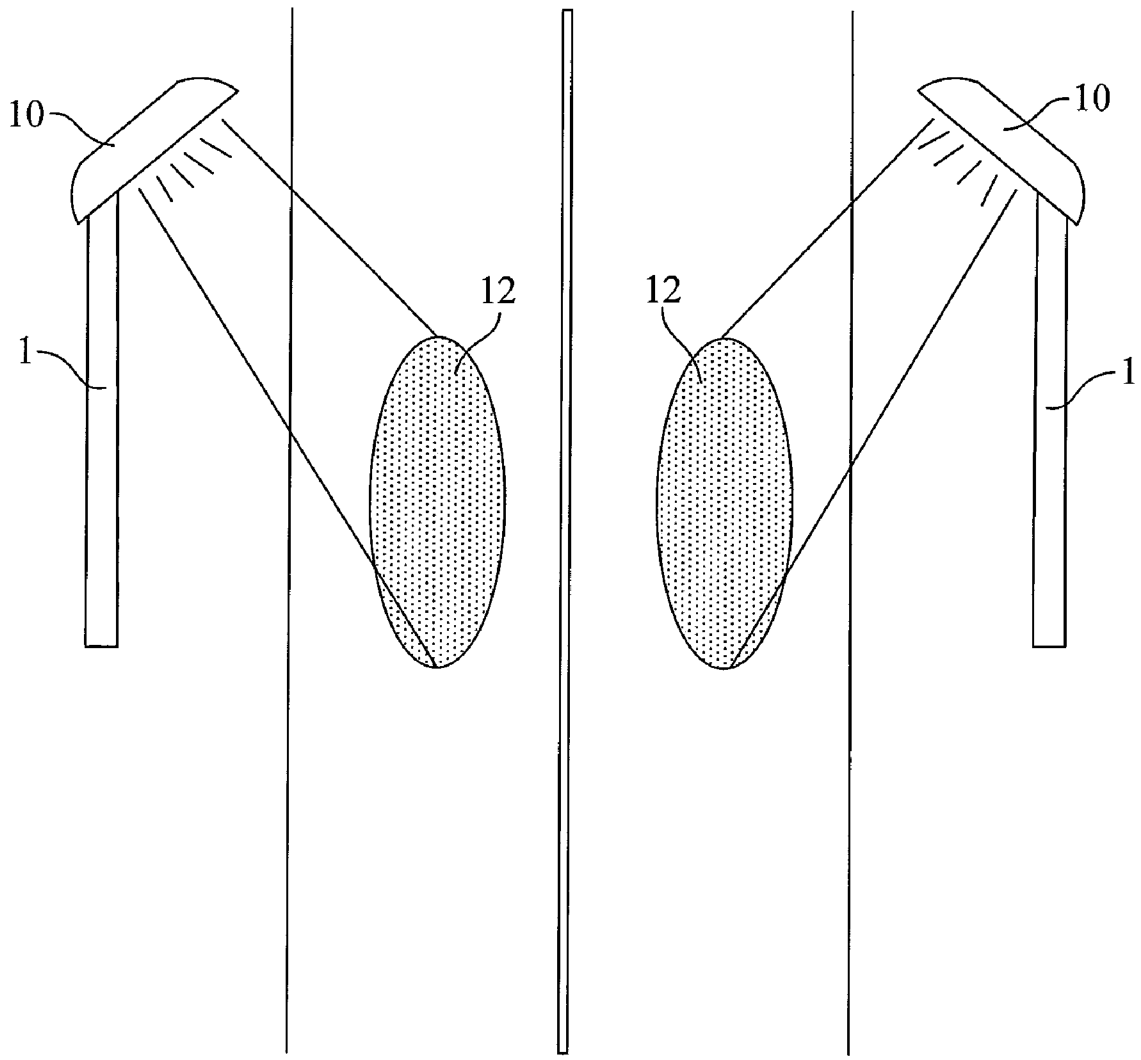
FIG. 1 (prior art)
FIG. 1 illustrates the schematic diagram of a street lamp in the prior art.
Figure 2A:
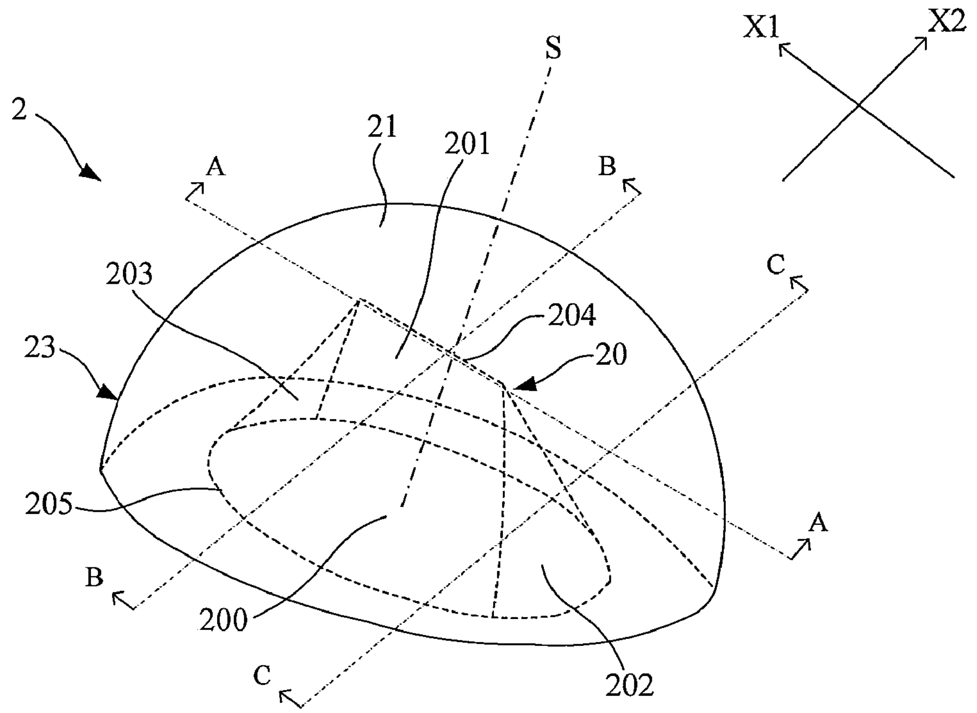
FIG. 2A illustrates a three-dimensional perspective view of the optical lens according to an embodiment of the invention.
Figure 3A:
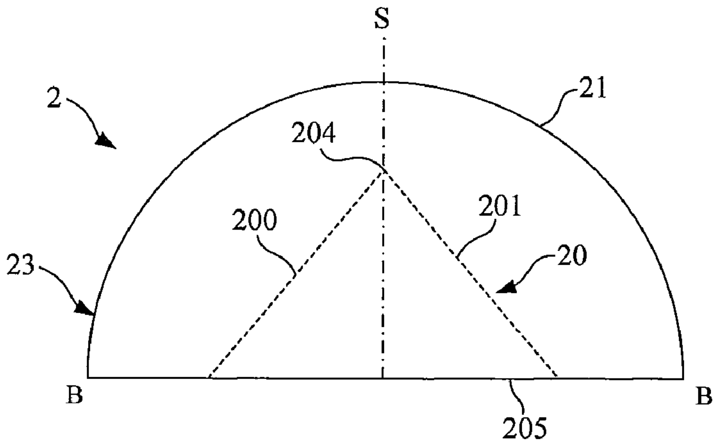
FIG. 3A illustrates a cross-section view of the optical lens from the cross hatching B-B in FIG. 2A toward a first direction.
Figure 3B:
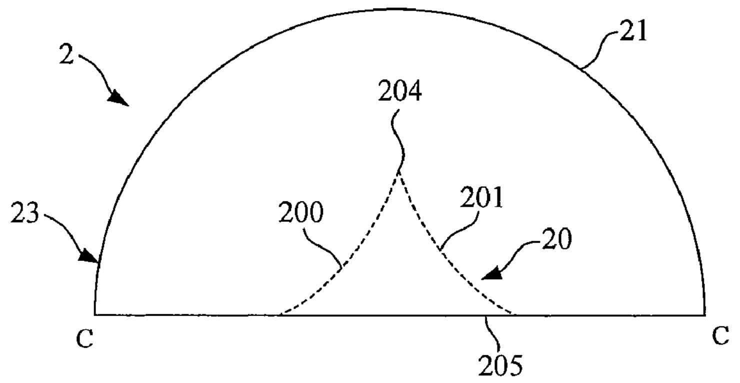
FIG. 3B illustrates a cross-section view of the optical lens from the cross hatching C-C in FIG. 2A toward the first direction.
Figure 3C:
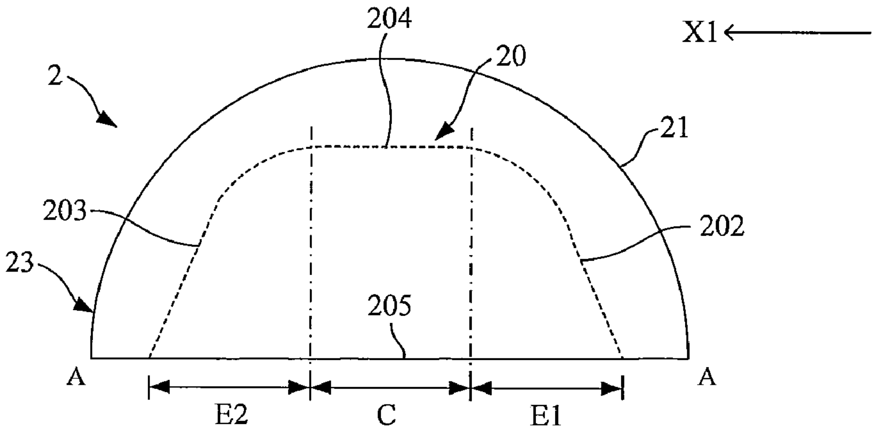
FIG. 3C illustrates a cross-section view of the optical lens from the cross hatching A-A in FIG. 2A toward a second direction.

Please refer to FIG. 2A and FIGS. 3A to 3C. FIG. 2A illustrates a three-dimensional perspective view of the optical lens 2 according to an embodiment of the invention. FIG. 3A illustrates a cross-section view of the optical lens 2 from the cross hatching B-B in FIG. 2A toward a first direction X1. FIG. 3B illustrates a cross-section view of the optical lens 2 from the cross hatching C-C in FIG. 2A toward the first direction X1. FIG. 3C illustrates a cross-section view of the optical lens 2 from the cross hatching A-A in FIG. 2A toward a second direction X2. It should be noted that the second direction X2 is perpendicular to the first direction X1.

As shown in FIG. 2A, the optical lens 2 includes a translucent body 23 which has a concave inner surface 20 to which light is incident. For example, the optical lens 2 can cover the light-emitting diode such that the concave inner surface 20 can receive the light emitting from the light-emitting diode. In addition to the inner surface 20, the translucent body 23 further has an outer surface 21 surrounding the inner surface 20, and the outer surface 21 can be a curved surface.

The inner surface 20 includes a first region 200, a second region 201, a third region 202 and a fourth region 203, wherein the second region 201 is opposite the first region 200, and the fourth region 203 is opposite the third region 202. The third region 202 is on one side of the first region 200 and the second region 201, while the fourth region 203 is on the other side of the first region 200 and the second region 201. Besides, both the third region 202 and the fourth region 203 connect with the first region 200 and the second region 201.

Referring to the surface morphology, it should be noted that both the first region 200 and the second region 201 are substantially straight planes. As shown in FIG. 2A, the first region 200 extends inclinedly from the edge 205 of the inner surface 20 to the center 204 of the inner surface 20, and the second region 201 also extends inclinedly from the edge 205 of the inner surface 20 to the center 204 of the inner surface 20 to connect with the first region 200. Furthermore, as shown in the embodiment of FIG. 2A, the center 204 of the inner surface 20 is a crest line. The first region 200 and the second region 201 extend inclinedly from the edge 205 of the inner surface 20 to the crest line, so as to connect with each other. It should be noted that the first direction X1 is along the extension direction of the crest line.

Besides, from the cross-section view of the translucent body 23 toward the first direction X1, the inner surface 20 substantially has a triangular outline, as shown in FIGS. 3A and 3B. Moreover, in this embodiment, the space enclosed by the concave inner surface 20 substantially has a triangular column shape.

It should be noted that from the cross-section view of FIG. 3C, the inner surface 20 defines a first edge portion E1, a second edge portion E2 and a central portion C, wherein the first edge portion E1 and the second edge portion E2 are separated by the central portion C and opposite to each other. FIG. 3C is the cross-section view of the translucent body 23 from the center 204 of the inner surface 20 toward the second direction X2. In addition, as shown in FIG. 3C, the inner surface 20 substantially has a trapezoid outline.

In this embodiment, it should be noted that when the inner surface 20 having the triangular outline is observed from cross-section views at different locations along the first direction X1, the triangular outline, from the cross-section view within the first edge portion E1 or second edge portion E2, becomes bigger gradually as the cross-section view approaches the central portion C; while the triangular outline, from the cross-section view within the central portion C, remains unchanged. Taking FIG. 3B as an example, it illustrates the cross-section view within the first edge portion E1 and toward the first direction X1. The triangular outline in FIG. 3B is smaller than that in FIG. 3A (the cross-section view within the central portion C and toward the first direction X1), and it can be observed from the outline of the third region 202, from the cross-section view within the first edge portion E1 toward the first direction X1, the triangular outline becomes bigger gradually as the cross-section view approaches the central portion C.

It should be noted that the cross-section view of FIG. 3A is from the central optical axis S toward the first direction X1, and the triangular outline has straight side edges as shown by marks 200 and 201. In contrast, the cross-section view of FIG. 3B is from the first edge portion E1 toward the first direction X1, but the triangular outline has curved side edges as shown by marks 200 and 201.

Referring to the third region 202 and the fourth region 203 in this embodiment, both the third region 202 and the fourth region 203 are curved surfaces and extend from the edge 205 of the inner surface 20 to the center 204 of the inner surface 20.

Figure 7A:
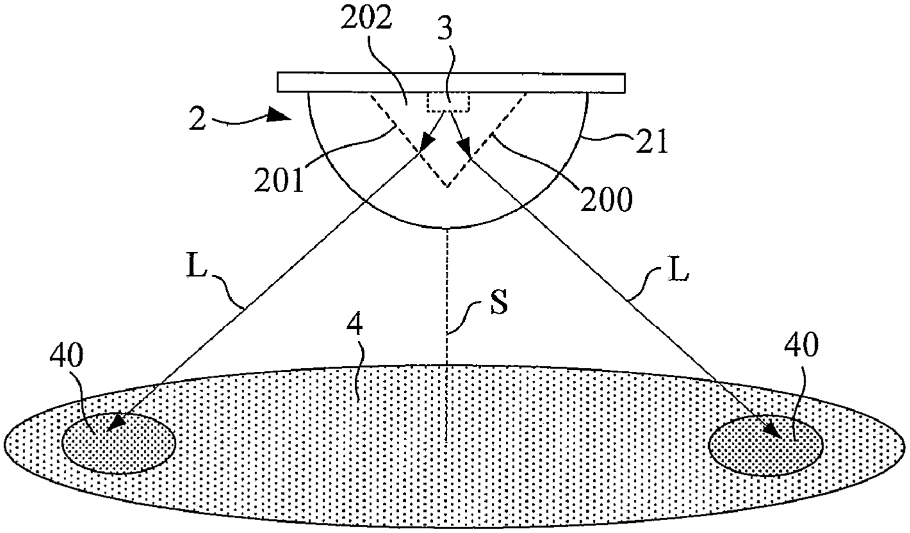
FIGS. 7A and 7B illustrate the schematic diagrams of the light fields formed through the optical lenses in FIG. 2A and FIG. 5 respectively.

Please refer to FIG. 7A. which illustrates the schematic diagram of the light field formed through the optical lens 2 in FIG. 2A.

It should be particularly explained that after the light L emitting from a light-emitting diode 3 device is incident to the first region 200 and the second region 201 of the concave inner surface 20, the first region 200 and the second region 201 can refract the incident light L and make the refracted light diverge from the central optical axis S of the lens further.

In comparison, after the light L emitting from the light-emitting diode 3 device is incident to the third region 202 and the fourth region 203 having curved surfaces, the traveling path of the light L can remain unchanged basically. Since the first region 200 and the second region 201 can make the refracted light diverge from the central optical axis S of the lens further, while the third region 202 and the fourth region 203 can make the traveling path of the light L remain unchanged, the light L emitting from the light-emitting diode 3 device can form an elliptic light field 4 after entering through the optical lens 2 of the invention, wherein the light refracted by the first region 200 and the second region 201 can further form two concentrated light fields 40 at two ends of the elliptic light field 4. The two concentrated light fields 40 are located along two viewing directions at two depression angles with respect to two sides of the light-emitting diode 3 respectively, wherein the depression angles can vary with the incline angles of the first region 200 and the second region 201 respectively.

Figure 2B:
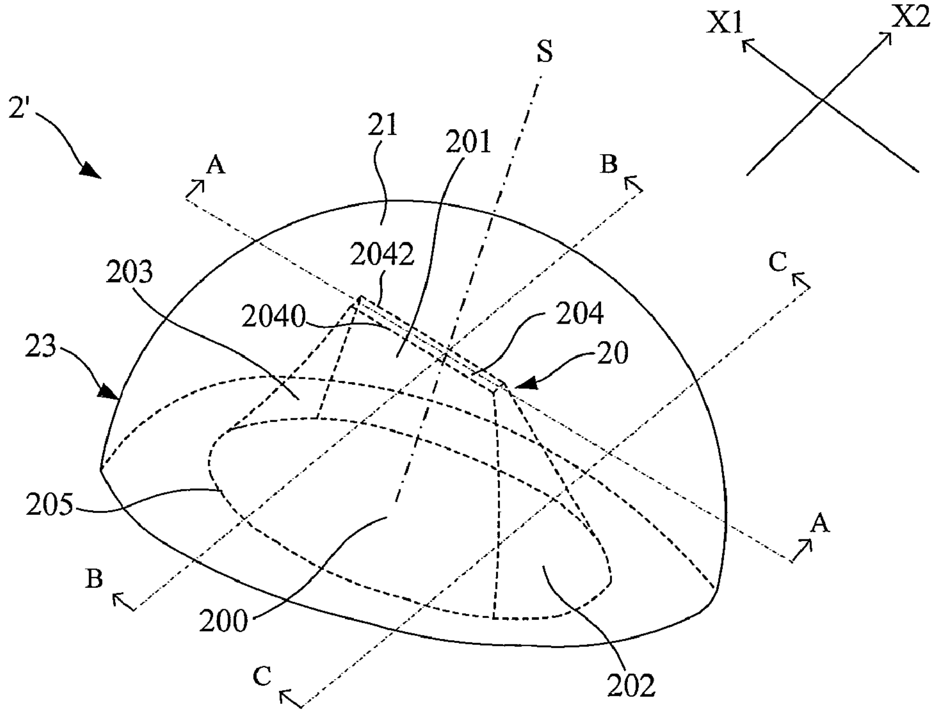
FIG. 2B illustrates a three-dimensional perspective view of the optical lens according to another embodiment of the invention.
Figure 3D:
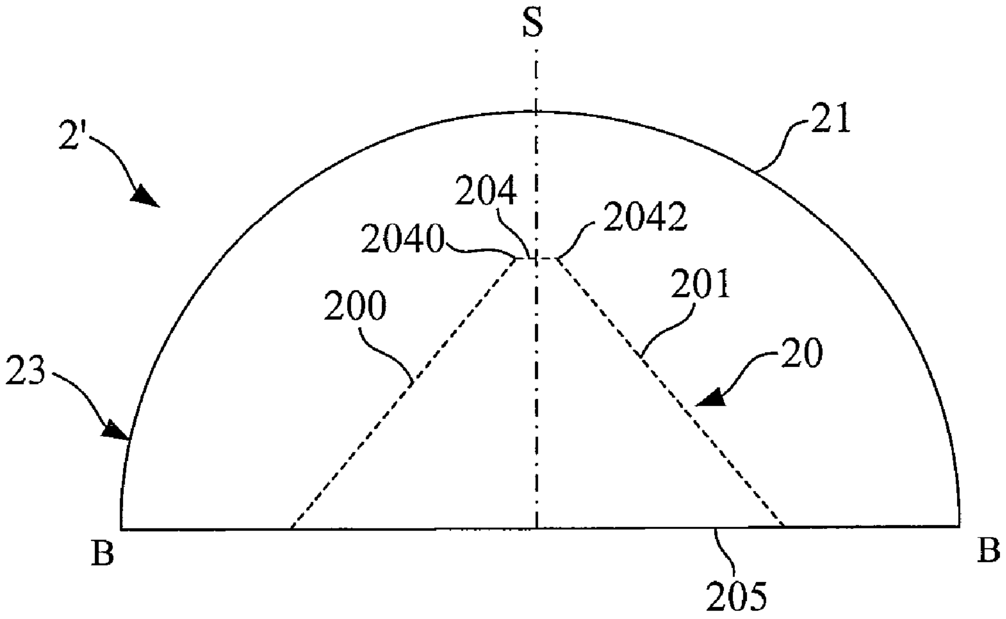
FIG. 3D illustrates a cross-section view of the optical lens from the cross hatching B-B in FIG. 2B toward the first direction.
Figure 3E:
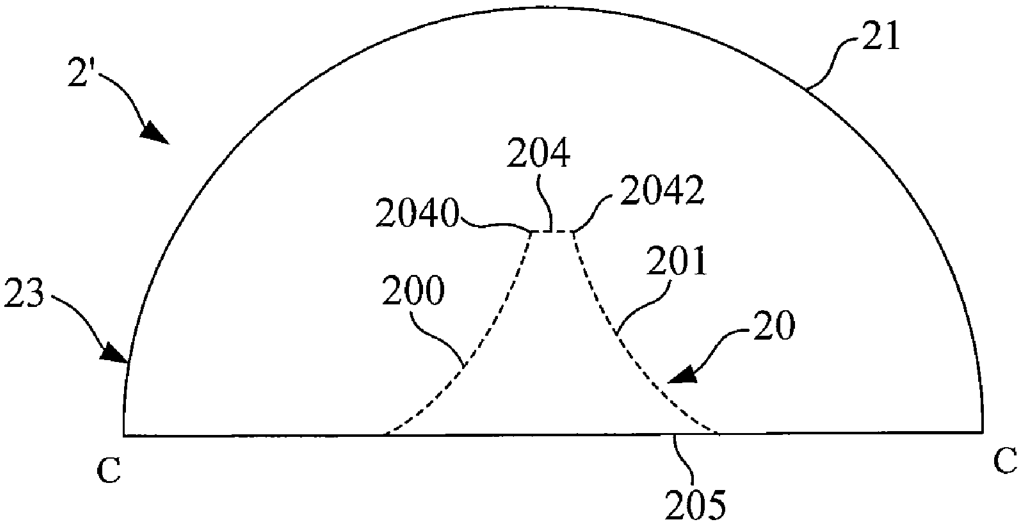
FIG. 3E illustrates a cross-section view of the optical lens from the cross hatching C-C in FIG. 2B toward the first direction.

Please refer to FIG. 2B, FIG. 3D and FIG. 3E. FIG. 2B illustrates a three-dimensional perspective view of the optical lens 2' according to another embodiment of the invention. FIG. 3D illustrates a cross-section view of the optical lens 2' from the cross hatching B-B in FIG. 2B toward the first direction X1. FIG. 3E illustrates a cross-section view of the optical lens 2' from the cross hatching C-C in FIG. 2B toward the first direction X1.

Compared to FIG. 2A, in this embodiment, the center 204 of the inner surface 20 is a flat region having two side edges (2040, 2042) opposite to each other. The first region 200 and the second region 201 extend inclinedly from the edge 205 of the inner surface 20 to the flat region and connect with the two side edges respectively. In addition, as shown in FIG. 3E, from the cross-section view toward the first direction X1 at the location away from the central portion C as defined in FIG. 3C, the outline of the inner surface 20 also has curved side edges as shown by marks 200 and 201.

Figure 5:
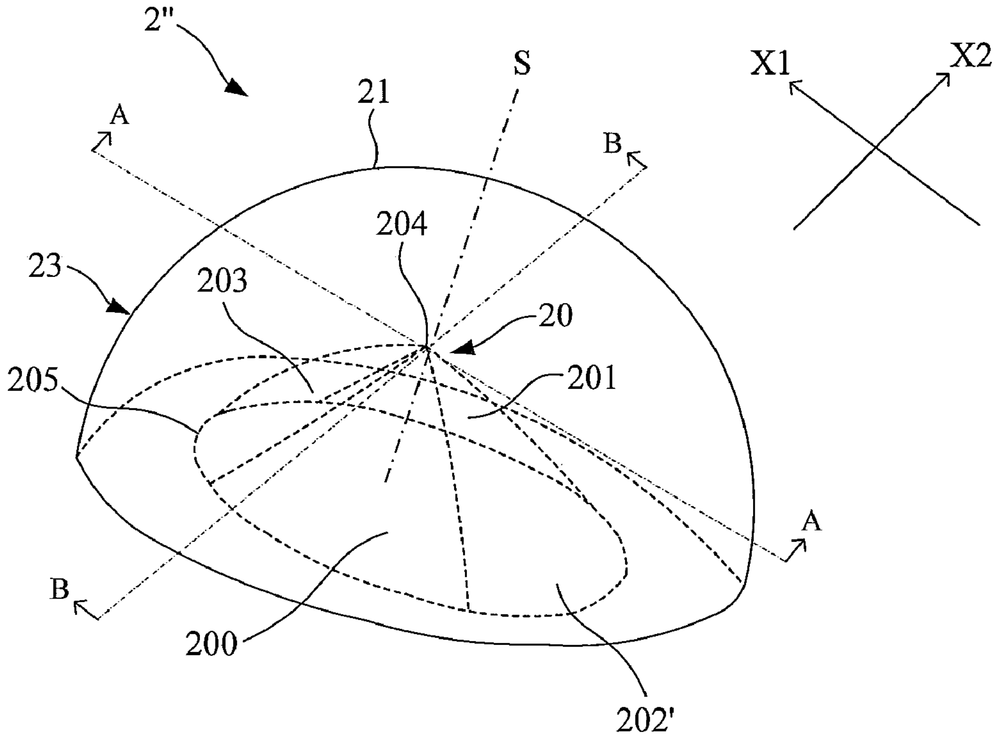
FIG. 5 illustrates a three-dimensional perspective view of the optical lens according to another embodiment of the invention.
Figure 6:
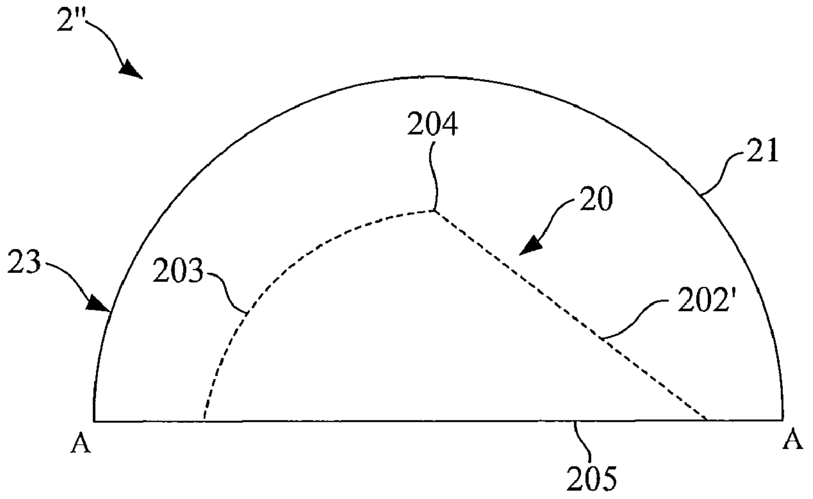
FIG. 6 illustrates a cross-section view of the optical lens from the cross hatching A-A in FIG. 5 toward the second direction.

Please refer to FIG. 5 and FIG. 6. FIG. 5 illustrates a three-dimensional perspective view of the optical lens 2" according to another embodiment of the invention. FIG. 6 illustrates a cross-section view of the optical lens 2" from the cross hatching A-A in FIG. 5 toward the second direction X2.

As shown in FIG. 6, it should be noted in this embodiment that the third region 202' is substantially a straight plane and extends inclinedly from the edge 205 of the inner surface 20 to the center 204 of the inner surface 20, while the fourth region 203 is a curved surface (the same as the fourth region 203 in FIG. 2A) and extends inclinedly from the edge 205 of the inner surface 20 to the center 204 of the inner surface 20. Besides, the cross-section view of the optical lens 2" from the cross hatching B-B toward the first direction X1 is the same as that in FIG. 3A.

Figure 7B:
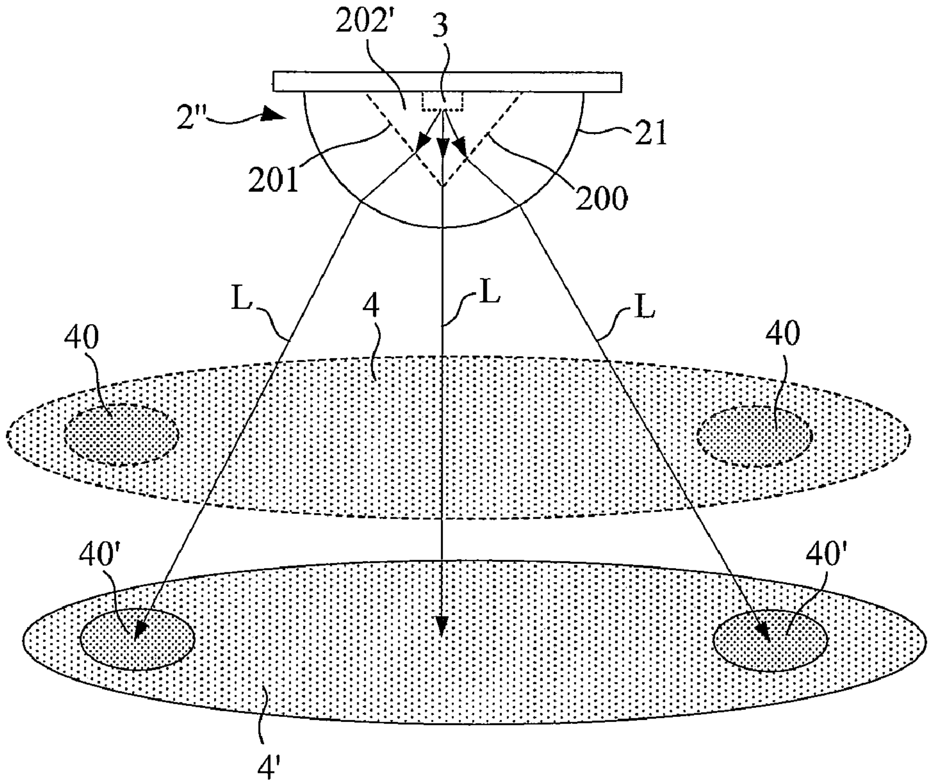

Please refer to FIG. 7B which illustrates the schematic diagram of the light field 4 formed through the optical lens 2" in FIG. 5.

As described previously, the light emitting from the light-emitting diode 3 can form the elliptic light field 4 after entering through the optical lens 2 in FIG. 2A, and since the third region 202' of the inner surface 20 of the optical lens 2" in FIG. 5 is substantially a straight plane and on one side of the first region 200 and the second region 201, the third region 202' can also refract the incident light, make the refracted light diverge from the central optical axis S of the lens further, and make the elliptic light field 4 shift away said one side where the third region 202' is to form the elliptic light field 4'. It should be noted that the shift distance can vary with the incline angle of the third region 202'.

Figure 8:
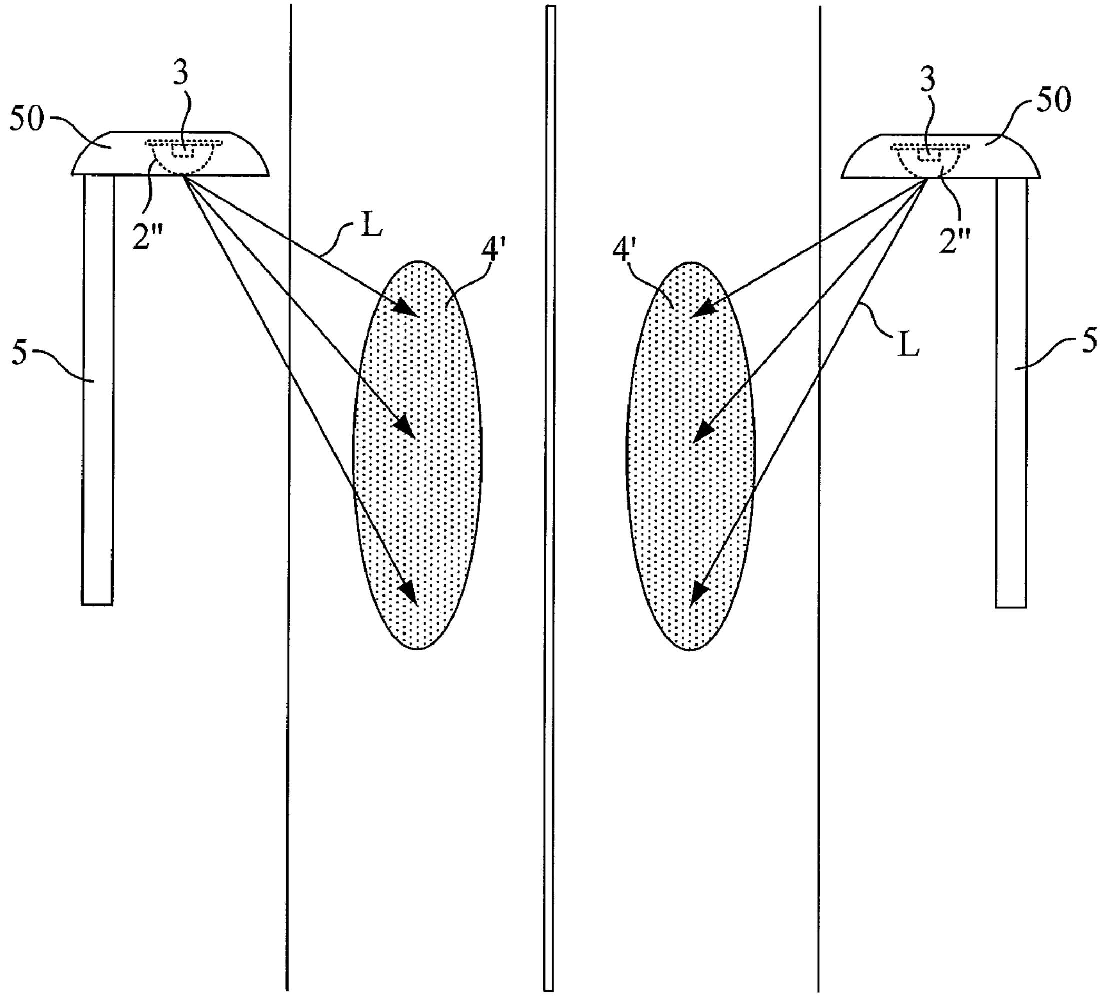
FIG. 8 illustrates the schematic diagram of the light field formed by a street lamp applying the optical lens in FIG. 5.

Please refer to FIG. 8 which illustrates the schematic diagram of the light field 4' formed by a street lamp 5 applying the optical lens 2" in FIG. 5. As shown in FIG. 8, the light emitting from the light-emitting diode 3 is refracted by the optical lens 2" so that the elliptic light field 4' is projected on the road inclinedly, and thus the street lamp 5 still can provide road illumination for the drivers without lifting up the lampshade 50 to avoid the glare phenomenon.

Figure 4:
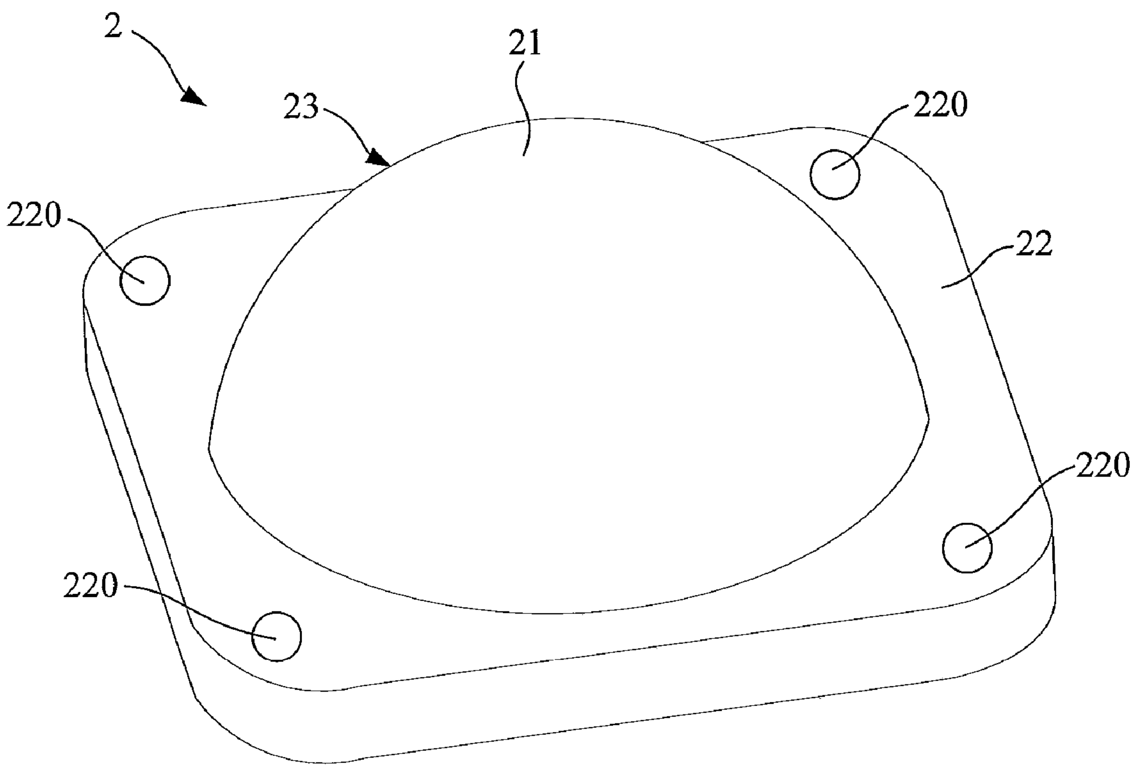
FIG. 4 illustrates an exterior view of the optical lens of the invention further including a holding seat.

Please refer to FIG. 4 which illustrates an exterior view of the optical lens of the invention further including a holding seat 22 for mounting the optical lens on the package structure of the light-emitting diode device. The holding seat 22 connects with the periphery of the translucent body 23, and the holding seat 22 has at least one formed-through fixing hole 220 for a fixing element to go through. Practically, the fixing hole 220 can be a screw hole adapted to a screw to mount the optical lens on the package structure of the light-emitting diode device. In regards to composition materials, the holding seat 22 can be made of a translucent material as the translucent body 23. In structure, the holding seat 22 and the translucent body 23 can be formed in one piece.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical lens for a light-emitting device, the optical lens comprising: a translucent body which has a concave inner surface to which light is incident, the inner surface including a first region and a second region opposite the first region, both the first region and the second region being substantially straight planes and extending inclinedly from the edge of the inner surface to the center of the inner surface respectively, so as to connect with each other, wherein the inner surface further includes a third region and a fourth region opposite the third region, both the third region and the fourth region connect with the first region and the second region, the third region is substantially a straight plane and extends inclinedly from the edge of the inner surface to the center of the inner surface, the fourth region is a curved surface and extends from the edge of the inner surface to the center of the inner surface.

2. The optical lens of claim 1, wherein the translucent body further has an outer surface surrounding the inner surface, and the outer surface is a curved surface.

3. The optical lens of claim 1, further comprising a holding seat which connects with the periphery of the translucent body, the holding seat has a formed-through fixing hole for a fixing element to go through.

4. The optical lens of claim 3, wherein the fixing hole is a screw hole.

5. The optical lens of claim 3, wherein the holding seat is made of a translucent material.

6. The optical lens of claim 3, wherein the holding seat and the translucent body are formed in one piece.

* * * * *